Patented Jan. 10, 1939

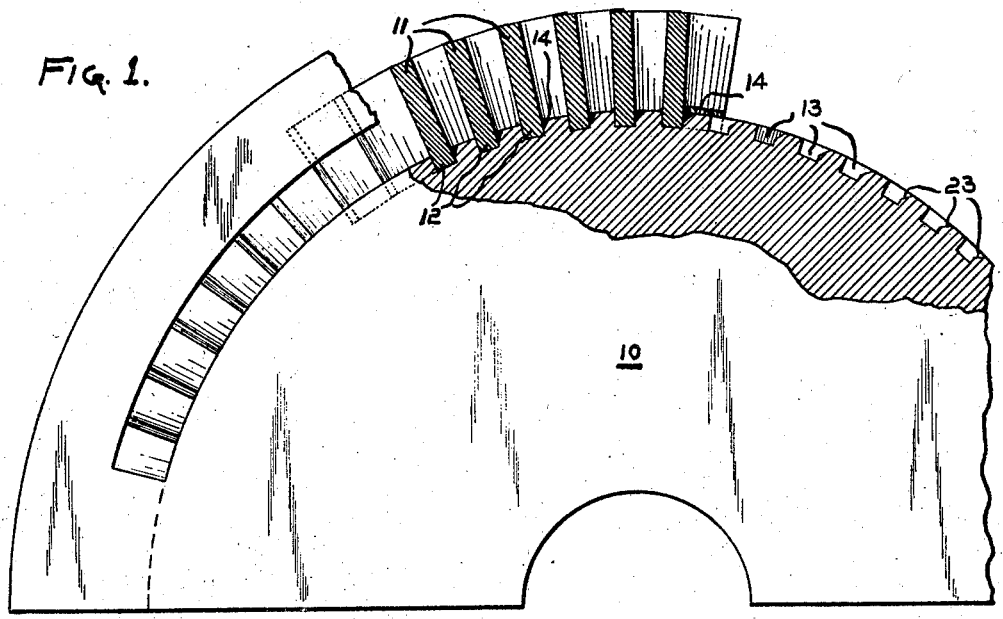
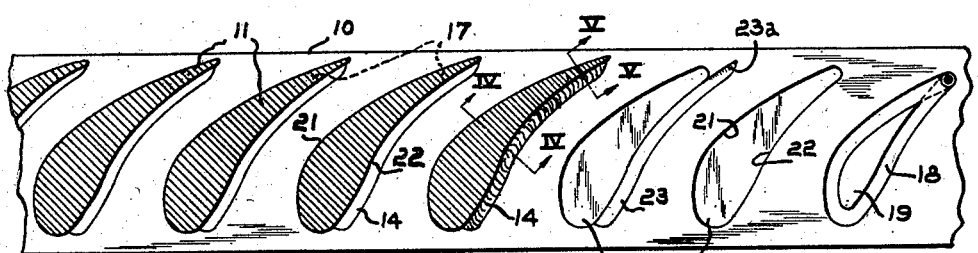
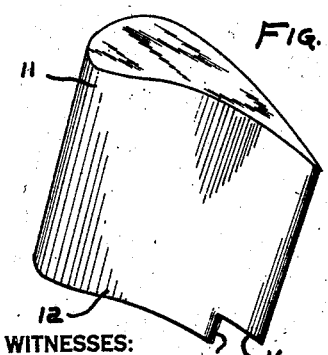
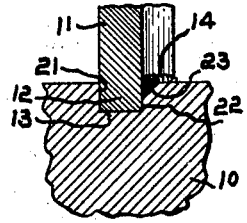

2,143,466

UNITED STATES PATENT OFFICE 2,143,466

TURBINE APPARATUS

Arthur R. Allard, Drexel Hill, Pa., assignor to Westinghouse Electric & Manufacturing Company, East Pittsburgh, Pa., a corporation of Pennsylvania Application December 31, 1937, Serial No. 182,653

4 Claims. (Cl. 253—77)

My invention relates to elastic fluid turbines and it has for an object to provide an improved blading or vane arrangement.

In accordance with my invention, I provide a turbine blading assembly comprising blades or vanes welded at their root ends to the periphery of a carrying or supporting member. The blades or vanes are cut from preformed stock, and the root end of each blade is welded to the carrying member on the side of the blade remote from the previously welded blade, so that the weld is accessible for the removal of excess weld metal before the next blade is welded. Preferably, the periphery of the carrying member is formed with transverse grooves to receive the roots of the blades, and the sides of each groove are conjugate to the corresponding sides of the blade roots. One side of each groove is beveled or cut away at the outer edge thereof to provide a recess for the reception of weld metal to secure the blade to the carrying member. The thin tail edges of the blade root portions may be cut away to provide a root portion having no decidedly thin part, thus eliminating the comparatively difficult and expensive machining of a corresponding thin tail portion for the grooves.

A further object of my invention is to so design a blade root that a receiving groove therefor can be easily machined in the blade carrying member.

A further object of my invention is to provide a blade assembly comprising blades of the reaction form having like ends attached to an arcuate member, the tails of the blades being relieved to provide terminal tenons fitting openings conforming to the sections thereof and the openings being beveled at one side for the reception of weld metal which autogenously connects the blades to the arcuate member.

A further object of my invention is to provide a turbine blade or vane assembly of such character that variations in dimensions of flow passages thereof are readily minimized.

These and other objects are effected by my invention as will be apparent from the following description and claims taken in accordance with the accompanying drawing, forming a part of this application, in which:

Fig. 1 is an elevational view, partly in section, showing a disc member having a portion of a blade row attached thereto;

Fig. 2 is an enlarged plan view, partly in section, of the structure shown in Fig. 1;

Fig. 3 is a perspective view of a blade prior to assembly;

Fig. 4 is a sectional view taken on the line IV—IV of Fig. 2, looking in the direction of the arrows; and Fig. 5 is a sectional view taken on the line V—V of Fig. 2, looking in the direction of the arrows.

Referring now to the drawing in detail there is shown a blade or vane assembly comprising a disc or arcuate member 10 and blades or vanes 11 joined to the disc member by having like ends 12 thereof fitting in recesses 13 of the disc member and autogenously connected to the latter by welds 14.

As the blade or vane member has a section or profile converging to a thin tail edge at the exit side, machining or milling, in the periphery of the arcuate member 10, of the recesses of corresponding outline would be difficult and expensive. Therefore, the thin tail-like portion of the blade is relieved, as shown, at 16, so that a root portion or tenon remains and has a section for which a recess of similar shape and dimensions can be satisfactorily and readily milled in the disc or arcuate member.

The end of the blade root portion 12, formed by relieving the thin tail edge at 15, is rounded, as at 17. The rounded or curved surface at 17 has a radius corresponding to that of the end milling cutter to be used in forming recesses 13.

In milling the recesses 13, an end miller having a radius corresponding to that of the curved surface 17 on the blade root is used to cut a path 18 outlining the recess, as shown at the right in Fig. 2. This outlining cut leaves an island 19 of metal which is removed by further milling.

As each recess 13 conforms to the section of the blade root fitting therein, its walls are conjugate to the sides of the blade root, one side wall of the recesses being concave, as at 21, and the opposite wall being convex, as at 22.

The blades are assembled one by one beginning with one end of the row of recesses 13, weld metal being applied at the forward side. Accordingly, the forward side wall of each recess is beveled or cut away, as at 23, for the reception of weld metal 14, the bevel extending past the narrow end of the recess in the form of a groove as at 23a, the bevel and groove providing, after a blade root is positioned in the recess, a space extending for substantially the full blade width with one face of the blade, including the tail portion thereof, contiguous thereto so that, when weld metal is deposited in said space, the blade will be autogenously connected for substantially its full width with the disc or arcuate member. Any excess weld metal, projecting beyond the peripheral surface of the disc 10 is removed in any suitable manner, as by cutting or grinding.

In practice, the blades 11 are mounted on or connected to the arcuate member or disc 10 one by one beginning with one end of the row, for example, the left-hand end as seen in Figs. 1 and 2. After the tenon 12 of a blade 11 is properly positioned in its recess 13, welding, preferably arc welding, occurs at the side thereof facing in the direction of blade assembly, the end of the welding rod being insertable in the channel 23, 23a. The channel is filled with weld metal 14 which forms an autogenous connection of one blade side, preferably the concave side, and the side of the channel 23, 23a and provides a body completely filling the recess and bracing the inner blade end in position. Surplus weld metal is then removed to provide a smooth finished top surface of the weld approximately reforming the peripheral surface of the disc 10, after which the next blade is inserted and so on, the welding and machining occurring at the forward side, in the direction of assembly, where there is ample space for these operations.

While I have shown the weld metal applied at the concave side of the blade, it will be obvious to those skilled in the art that the channel 23 and weld metal 14 could be provided at the convex side of blade with equally satisfactory results. In that case, assembly of the blades would occur from right to left as seen in Figs. 1 and 2.

The construction herein disclosed has two especially important advantages over prior construction, one being accuracy of flow passage dimensions and the other being strength.

The spacing of the blades 11 to define flow passages therebetween is dependent upon the spacing of the recesses 13 since the latter closely receive the root portions of the former and permit of no material movement thereof even prior to welding. Hence, it follows that if the recesses 13 are accurately spaced the blades 11 will be similarly spaced, resulting in a series of flow passages between the blades of uniform area, a feature which is highly desirable. With the use of a boring or end milling machine the recesses 13 are spaced and machined with the desired high degree of accuracy.

The construction also provides a connection between the blades and disc member of great strength and rigidity. As clearly shown in Fig. 4, the blade 11 has rigid engagement with the disc member 10 laterally in all directions. The only direction in which any movement is possible is outwardly radially of the disc 10. However, possibility of movement in this direction is overcome by the wedge-shaped arcuate body of weld metal 14. Further, the greatest lateral force on the blade will be applied against the concave working face thereof. This force is opposed by the solid backing of the convex surface of the blade root by the concave lateral wall of the recess 13. (See Fig. 4.)

The term "blade" is used herein in the sense of a blade or vane element.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In a blade row assembly, blade members, an arcuate member having recesses for like ends of the blade members of the same shape and size as the section of the latter, said recesses having bevels at one side thereof cooperating with blade faces to provide grooves for reception of weld metal, and weld metal in the grooves for autogenously connecting the blades to the arcuate member.

2. In a blade row assembly, blade members having faces which converge to provide thin tail exit edges, and the root portions thereof having the thin tail edges cut away, an arcuate member having recesses therein conforming in shape to the sections of the blade member root portions, said recesses having bevels at the outer edge of one of their side walls to provide, with faces of the blades, grooves for the reception of weld metal, and weld metal in the grooves for autogenously connecting the blade members to the arcuate member.

3. In a blade row assembly, blades having root portions provided with convex and concave faces which are continuous with the blade faces, a holding member having recesses of the same size and shape as the section of the blade root portions, said recesses being provided in the periphery of the holding member and disposed transversely thereof, each recess having a bevel at the outer edge of a convex wall and which cooperates with the root portion therein to provide a groove for the reception of weld metal, and weld metal in the grooves for autogenously connecting the blades to the holding member.

4. In a blade row assembly, blade members having convex and concave faces and being of uniform cross section throughout their length except at the root portion where the thin tail edge is cut away, a holding member having recesses extending transversely of its periphery and conforming in shape to the section of the blade member root portions, said holding member having grooves formed therein adjacent to one blade face for substantially the full width of the blade and each groove being formed in part by a bevel at the outer edge of one recess side wall and the blade member in the recess, and weld metal in said grooves and forming autogenous connections between one face of the blade members and the holding member.

ARTHUR R. ALLARD.